United States Patent [19]

Weitz

[11] E Patent Number: Re. 31,842

[45] Reissued Date of Patent: Mar. 5, 1985

[54] WELL WASHING TOOL AND METHOD

[75] Inventor: Robert D. Weitz, Houma, La.

[73] Assignee: Top Tool Company, Inc., Houma, La.

[21] Appl. No.: 414,619

[22] Filed: Sep. 3, 1982

Related U.S. Patent Documents

Reissue of:

[64] Patent No.: 4,279,306
Issued: Jul. 21, 1981
Appl. No.: 65,520
Filed: Aug. 10, 1979

[51] Int. Cl.[3] ..... E21B 37/00; E21B 33/124

[52] U.S. Cl. ..... 166/312; 166/147; 166/187

[58] Field of Search ..... 166/127, 147, 151, 191, 166/187, 312, 311; 173/49.1, 49.5

[56] References Cited

U.S. PATENT DOCUMENTS

| | | | |
|---|---|---|---|
| 1,802,525 | 4/1931 | Newlin | 166/147 |
| 1,808,958 | 6/1931 | Lane et al. | 166/147 |
| 2,204,340 | 6/1940 | Bradshaw | 166/193 |
| 2,512,801 | 6/1950 | Kinney et al. | 166/191 |
| 2,633,200 | 3/1953 | Humason | 166/187 |
| 2,715,444 | 8/1955 | Fewel | 166/147 |
| 2,762,441 | 9/1956 | Newlin | 166/186 |
| 2,766,828 | 10/1956 | Rachford, Jr. | 175/4.52 |
| 2,998,721 | 9/1961 | Gawlik | 166/187 |
| 3,059,699 | 10/1962 | Brown | 166/187 |
| 3,169,580 | 2/1965 | Bateman | 166/147 |
| 3,199,598 | 8/1965 | Loomis | 166/147 |
| 3,503,249 | 3/1970 | Dumond | 73/49.1 |
| 4,018,272 | 4/1977 | Brown et al. | 166/120 |

*Primary Examiner*—James A. Leppink
*Assistant Examiner*—Hoang C. Dang
*Attorney, Agent, or Firm*—Bill B. Berryhill

[57] ABSTRACT

A well washing tool which may comprise: a tubular mandrel; first and second packer assemblies carried on the mandrel at opposite ends thereof; an outer tubular body surrounding the mandrel between the packer assemblies; an annular chamber between the mandrel and the surrounding tubular body; and a valve assembly carried within the annular chamber. The tubular mandrel is adapted for connecting the tool in a pipe string extending to the surface of the well and the lower end may be adapted for blocking flow of fluids from the pipe string through the mandrel flow passage. Ports are provided in the walls of the mandrel and the tubular body permitting fluid communication between the mandrel flow passage and the exterior of the tool. The valve assembly prevents such fluid communication by blocking one or more of the ports. The packer assemblies are actuated by a predetermined pressure and the valve assembly is responsive to a higher predetermined pressure to unblock the ports permitting fluid communication between the mandrel flow passage and the exterior of the tool through the annular chamber.

22 Claims, 2 Drawing Figures

WELL WASHING TOOL AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to tools for use in completing oil and/or gas wells. Specifically, it pertains to a washing tool and method suitable for circulating fluid through well conduits and surrounding formations for various treatments thereof.

2. Description of the Prior Art

In completing an oil or gas well after drilling a hole therefor, it is common to install a production casing and to perforate the casing at the producing formation. After completion, the oil and/or gas flows from the formation through the perforations into the production casing where it is usually communicated to the surface of the well through production tubing.

Frequently it is necessary or desirable to treat the formation surrounding the perforated casing in some way to enhance the flow of fluids therefrom. Some methods of treating formations include circulating water or acidized fluid through the formation via the casing perforations and back up the casing string. By such circulation, loose sands may be washed from the formation or consolidated with various materials. Voids may be created for more effective gravel packing, tight formations may be made more susceptible to flow, etc.

In performing such circulating operations, various washing tools have been developed which generally provide some method of packing off an area of the casing for circulation. Such tools are usually attached to the lower end of a washing string, lowered into the casing to the desired depth, packed off and circulating commenced. In most of the tools of the prior art, packing is accomplished by providing packers on the washing tools on opposite sides of the perforations through which the fluid is to flow from the tool. Circulating fluid flows down the circulating string, through the tool, between the packers and out the casing perforations into the formation. Flow then continues back into the casing through perforations above the packers so that the returning fluid flows upwardly through the casing above the tool.

The packers used in washing tools of the prior art are usually of the cup type. Prior art washing tools utilizing cup type packers are made by the Baker Division of Baker Oil Tools, Inc. and Cavins Corporation. Cup type packers leave something to be desired in dependability, failing to adequately seal under many conditions. Furthermore, since the cup type packers engage the casing while the tool is being run into the well or pulled out of it, they are frequently torn or damaged during use.

Upon completion of circulation, it may be desirable to reverse circulate for removing sand or other materials from the bottom of the well hole. This is difficult to effectively accomplish with cup type packers since the packers remain engaged with the casing and since some of them may be flared in a direction which would actually oppose reverse flow. Another problem associated with cup type packers is the possibility of swabbing in the well or pulling sand into the casing when the tool is removed therefrom.

SUMMARY OF THE INVENTION

In the present invention a circulating or washing tool and method are provided which eliminate many of the problems associated with cup type packer washing tools. The tool of the present invention includes a tubular mandrel having a flow passage therethrough and the upper end of which is adapted for connecting the tool in a pipe string extending to the surface of the well, the lower end being provided with means for blocking the flow of fluids from the pipe string through the mandrel flow passage. First and second packer assemblies are carried on the mandrel at the opposite ends thereof and an outer tubular body surrounds the mandrel between the packer assemblies. An annular chamber is provided between the mandrel and the surrounding tubular body. The annular chamber is in fluid communication with the mandrel flow passage through ports in the walls of the mandrel and the tubular body is provided with ports which permit fluid communication between the annular chamber and the exterior of the tool.

A valve assembly is carried within the annular chamber blocking the ports in the tubular body and preventing fluid communication between the annular chamber and the tool exterior. However, the valve assembly is responsive to predetermined pressure communicated to the annular chamber through the mandrel ports to unblock the tubular body ports permitting fluid communication between the mandrel flow passage and the tool exterior through the mandrel ports, the annular chamber and the tubular body ports. The packer assemblies are also responsive to a predetermined pressure communicated to the annular chamber through the mandrel ports for actuation thereof. In fact, the packer assemblies are responsive to a lower predetermined pressure than the valve assembly. Thus, the packer assemblies may first be set and then the valve assembly actuated to provide the fluid communication necessary for circulating fluids through the tool for washing the surrounding formation.

The tool is operated by lowering on a pipe string to the necessary level in a perforated casing. Then the lower end of the mandrel flow passage is closed or blocked by suitable means and pressure applied to the annular chamber through the pipe string. Upon reaching a first predetermined pressure level, the packer assemblies are axially compressed and radially expanded until they sealingly engage the walls of the surrounding perforated casing. A further increase in pressure actuates the valve assembly to open tubular body ports and fluids in the pipe string begin to flow to the exterior of the tool through the perforations isolated by the packing assemblies and into the surrounding well strata. The fluid reenters the casing string through perforations above the packer assemblies for return to the surface of the well. After circulation, pressure in the annular chamber is relieved, allowing the valve assembly to close and the packer assemblies to disengage the casing walls. Reverse circulation may be performed to clean sand or debris from the bottom of the hole.

Thus, the circulating or washing tool of the present invention is simple in construction and operation. Due to the hydraulically set packers, it is more reliable than washing tools utilizing cup type packers. Furthermore, such construction permits the tool to be lowered in the well without interference between the packing elements and the casing string so that the packing elements are not damaged on lowering into the well. The tool is short and compact, allowing it to pass through tight areas or slightly out of line casing sections. In addition, after circulation and release of pressure, the packing assemblies are radially contracted for reverse circulation and removal so that there is no danger of swabbing in the well or pulling sand into the casing while the tool is being removed.

Many other advantages of the tool will be understood from reading the specification which follows in conjunction with the accompanying drawings.

DESCRIPTION OF A PREFERRED EMBODIMENT

Figure 1:
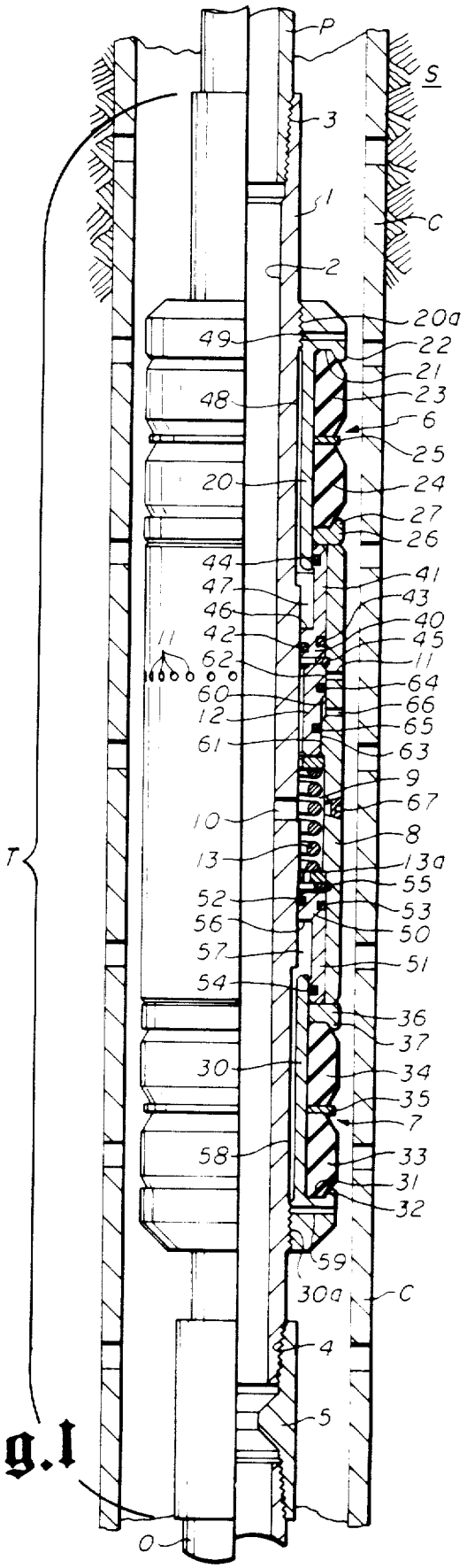
FIG. 1 is a sectional elevation view of casing within a well hole showing the washing tool of the present invention in quarter-section and in the unset or running in position.

Referring first to FIG. 1, there is shown the washing tool T of the present invention attached to the lower end of a pipe string P in a perforated casing C of a well having surrounding strata S. The tool T includes a tubular mandrel 1 having a central flow passage 2 therethrough and the upper end of which is provided with means such as threads 3 for connecting the tool to the pipe string P which extends to the surface of the well. The lower end of the mandrel may be threadedly connected at 4 to a ball sub 5 or the like, the purpose of which is to block flow of fluids from the pipe string through the mandrel flow passage when desired. However, in FIG. 1, there is no blockage and flow is permitted through the mandrel flow passage 2 so that if there is any fluid in the casing C, it may be displaced upwardly through the pipe string P as the tool T is lowered into the well. Other tools O, may be attached to the ball sub if desired.

First and second packer assemblies 6 and 7 are carried at opposite ends of the mandrel. These assemblies 6 and 7 will be more fully described hereafter. An outer tubular body 8 surrounds the mandrel 1 between packer assemblies 6 and 7 leaving an annular chamber 9 therebetween.

The annular chamber 9 is in fluid communication with the mandrel flow passage 2 through at least one port 10. The tubular body 8 is provided with a plurality of ports 11 which under certain conditions permit fluid communication between the annular chamber 9 and the exterior of the tool T.

Carried within the annular chamber 9 is a valve assembly, including a differential piston member 12 and biasing spring 13, which in the running position of FIG. 1 blocks the ports 11 preventing fluid communication between the annular chamber 9 and the exterior of the tool. The valve assembly will be more fully described hereafter.

Each of the packer assemblies 6 and 7 includes a tubular packer body 20, 30, which is carried on the mandrel 1 having an annular shoulder 21, 31 and an annular lip 22, 32, thereon. A plurality of resilient packer elements 23, 24, 33, 34, surround the packer bodies 20, 30 adjacent the annular shoulders 22, 32, and may be separated by ring spacers 25, 35. Each packer assembly may also be provided with an annular retainer ring 26, 36 which may also have an annular lip 27, 37, thereon.

Each packer assembly also includes an annular piston comprising an annular head portion 40, 50 and a tubular sleeve portion 41, 51 extending therefrom. The head portion slidingly and sealingly engages the exterior of mandrel 1 and the interior of tubular body 8. The sleeve portion 41, 51 slidingly and sealingly engages the exterior of the respective packer bodies 20, 30. Annular seals 42, 43, 44 and 52, 53, 54 assure sealing at these points of sliding and sealing engagement. It will be noted that in the unset position shown in FIG. 1, the head ends of the pistons rest against snap rings 45, 55 attached to the tubular body 8 and the sleeve ends 41, 51 bear against the packer retainer rings 26, 36.

The sleeve portions 41, 51 and the inner diameter of the head portions 40 and 50 of the packer pistons are joined by annular surfaces 46, 56 which along with the sleeve portions 41, 51, mandrel 1 and the ends of packer bodies 20 and 30 form variable annular chambers 47, 57. These variable annular chambers 47, 57 may be vented to the exterior of the tool through longitudinal ports 48, 58 and radial ports 49, 59.

It will also be noted that the packer bodies 20 and 30 are shown attached to the mandrel 2 by threaded connections 20a and 30a allowing removal of the packer body from the mandrel 1. This then would also permit removal of all of the elements of the packer assembly including the packer elements and the packer pistons.

In examining the interior of the tubular body 8, it will be seen that it is provided with a first cylindrical surface 60 and an adjacent second cylindrical surface 61 of slightly smaller diameter. The differential piston 12 of the valve assembly is provided with a corresponding first cylindrical end portion 62 and a second cylindrical opposite end portion 63 of smaller diameter. The end portion [62] *63* slidingly and sealingly engages cylindrical surface 60 of tubular member 8 and the opposite end portion 63 slidingly and sealingly engages a second smaller diameter cylindrical surface 61 of the tubular member 8. Thus the effective annular area exposed to pressure in the annular chamber 9 is greater at the first end portion 62 than at the second opposing end portion 63. Annular seals 64 and 65 assure sealing at these points of contact. At least one relief portion 66 is provided through the walls of the tubular member 8 between the first and second annular seals 64 and 65 through which fluids these seals may be displaced to the exterior of the tool. A small bleed port 67 may be provided in the walls of the tubular member 8 in direct communication with annular chamber 9.

As previously mentioned, the valve assembly includes a biasing spring 13 between the differential piston member and a spring retainer 13a at the fixed snap ring 55. The biasing spring 13 biases the piston 12 toward the position of FIG. 1, blocking ports 11.

STATEMENT OF OPERATION

To utilize the tool T for circulating operations, it is attached to the pipe string P and lowered into the perforated casing c to the desired depth in the unset position illustrated in FIG. 1. Then a resilient ball member B is dropped through the pipe string P through the mandrel passage 2 for engagement with seating surface 5a of the ball sub 5. (See FIG. 2) This blocks flow at the end of the mandrel flow passage 2. Then, pressure is increased through the pipe string P, fluid entering the annular chamber 9 through mandrel ports 10. As pressure is increased to a first predetermined level, the pressure exerted against the packer piston head portions 40, 50, forces the pistons toward the packing elements 23, 24, 33, 34, axially compressing them between the respective annular shoulders 21, [26]*31*, until they are radially expanded to sealingly engage the inner walls of the casing C. Any fluids in the variable annular chambers 47 and 57 are displaced through ports 48 49, 58, 59. The set position of the packers 6 and 7 are shown in FIG. 2.

Figure 2:
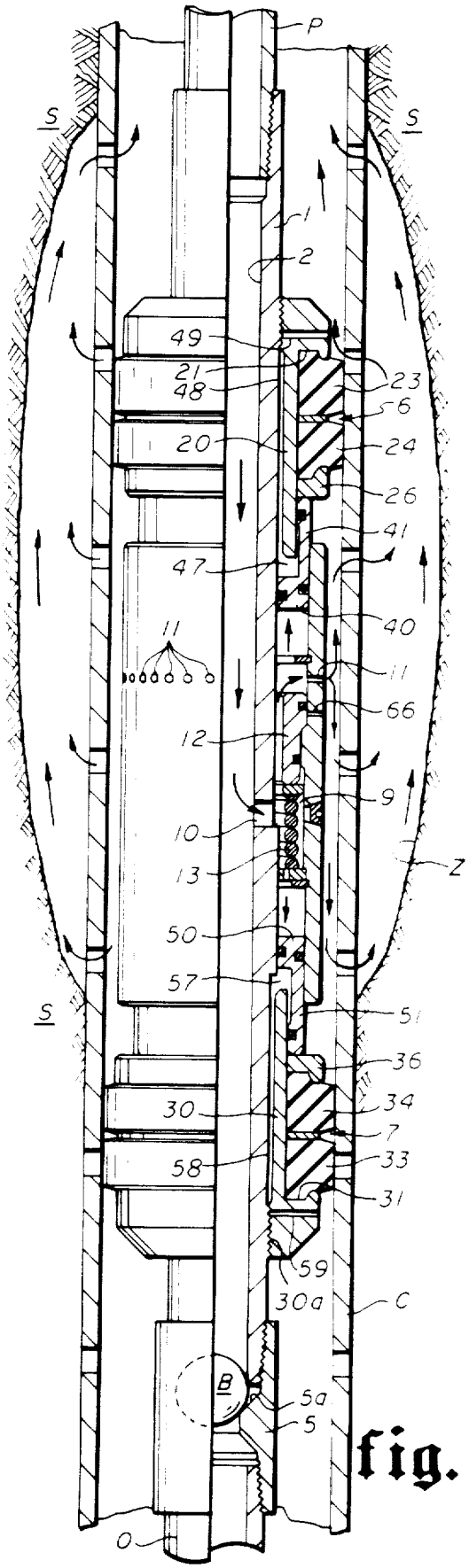
FIG. 2 is a sectional elevation view similar to FIG. 1 but showing the tool in its set position for circulation of fluids through the tool and the casing perforations into the surrounding formation.

A further increase in pressure to a higher predetermined level forces the differential piston 12 of the valve assembly downwardly, as viewed in FIG. 2, compressing the biasing spring 13. This is due to the differential pressure area of the piston 12 previously described herein. As the piston 12 moves downwardly, any fluids between seals 64 and 65 are displaced through the relief port 66 and the tubular member ports 11 are opened, as seen in FIG. 2. Fluid then flows from the pipe string P through the mandrel flow passage 2, ports 10, annular chamber 9, and ports 11, to the exterior of the tool. Since the casing is sealed or packed off by the packer assembly 6 and 7, the fluid exiting through the ports 11 continues through the perforations of the casing C between the packer assemblies 6 nd 7 to enter the surrounding well strata S, washing the loose sand or treating the strata in such a way as to create a surrounding zone or area Z for improving the flow characteristics of the well. The circulating fluid and materials carried therewith then reenter the casing C through perforations above the packing assembly 6 where the fluids and entrained materials continue to the surface of the well for disposal.

After it is determined that enough circulation has occurred, pressure is relieved from the pipe string and consequently, the annular chamber 9 of the tool T. As pressure is relieved, the differential piston 12 returns to the blocked position of FIG. 1 due to the reduction in pressure and the force of biasing spring 13. Further reduction in pressure allows the packing elements 23, 24 and 33, 34, to radially contract and axially expand, forcing the packer pistons to return to the initial position of FIG. 1.

If desired, flow can then be reversed down the casing through the perforations above the packing assemblies 6 into the washed out zone Z and around the packing elements 6 and 7 to beneath the ball sub 5. Further circulation will cause the ball B to be displaced to the surface of the well for removal. Reverse circulation may continue off the bottom of the well hole, causing any sand or debris at the bottom of the well hole to be removed from the well through mandrel flow passage 2 and the pipe string P.

The entire tool T may be removed from the well by lifting it on the pipe string P. Since the packing assemblies 6 and 7 are now unset, there is no danger of swabbing in the well or pulling sand into the casing by creating a vacuum therein. Furthermore, the packing elements 23, 24, 34, 31 are not damaged as the tool is removed.

Another feature of the tool of the present invention is the ability to reperforate the well if the first casing perforations are not sufficient, without completely removing the tool. If the ball sub 5 is replaced by a full bore opening valve, this can be done by opening the valve and lifting the tool in the pipe string P for a short distance. Then, a tubing gun can be lowered through the pipe string P, the full opening flow passage 2 of the mandrel and the valve, to a position below the tool T and perforation performed. Then the perforating gun can be removed, the tool T lowered again and circulating repeated. This eliminates the need to completely remove the tool T from the well saving the time necessary for doing so with tools of the prior art.

Thus, it is seen from the foregoing description that the washing tool of the present invention is extremely efficient, easy to use and versatile. Furthermore, it is relatively simple to manufacture and maintain. While a single embodiment of the invention has been described herein, many variations can be made without departing from the spirit of the invention. Therefore, it is intended that the scope of the invention be limited only by the claims which follow.

I claim:

1. A well washing tool comprising:

a tubular mandrel having a flow passage therethrough and the upper end of which is open and provided with means for connecting said tool in a pipe string extending to the surface of a well and the lower end of which is normally open but which may be provided with means for blocking flow of fluids from said pipe string through said mandrel flow passage;

first and second packer assemblies carried on said mandrel at opposite ends thereof;

an outer tubular body surrounding said mandrel between said packer assemblies;

an annular chamber between said mandrel and said surrounding tubular body, said annular chamber being in fluid communication with said mandrel flow passage through first port means provided in the walls of said mandrel, said tubular body being provided with second port means permitting fluid communication between said annular chamber and the exterior of said [tools] *tool*; and valve means carried within said annular chamber independently of said packer assemblies blocking said second port means and preventing said fluid communication between said annular chamber and said tool exterior but responsive to predetermined pressure communicated to said annular chamber through said first port means to unblock said second port means permitting fluid communication between said mandrel flow passage and said tool exterior through said first port means, said annular chamber and said second port means.

2. A well washing tool as set forth in claim 1 in which each of said packer assemblies comprises a tubular packer body carried by said mandrel having an annular shoulder thereon, at least one resilient packer element surrounding said packer body adjacent said annular shoulder and an annular piston member slidingly engaging the exterior of said packer body and one end of which is exposed to pressure within said annular chamber, said piston member being responsive to predetermined pressure, lower than said predetermined pressure for response of said valve means, communicated to said annular chamber through said port to move toward said annular shoulder axially compressing said packer element therebetween and forcing said packer element to radially expand without unblocking of said second port means by said valve means.

3. A well washing tool as set forth in claim 2 in which said packer assembly includes a retainer ring slidingly surrounding said packer body between said packer element and said annular piston member, said packer element being compressible between said retainer ring and said annular shoulder upon said movement of said piston member in response to said predetermined pressure.

4. A well washing tool as set forth in claim 2 in which said packer body is removably attached to said mandrel, removal of said packer body from said mandrel permitting removal of said packer element and said piston member from said mandrel.

5. A well washing tool as set forth in claim 2 in which said valve means includes biasing means, independent of said packer assemblies, by which said valve means is biased toward said blocking position, said biasing means capable of being overcome by said predetermined pressure in said annular chamber to permit movement of said valve means to said unblocked position.

6. A well washing tool as set forth in claim 1 in which the interior of said outer tubular body is provided with a first cylindrical surface and an adjacent second cylindrical surface of smaller diameter and in which said valve means comprises an annular differential piston member, the exterior of which is provided with a first cylindrical end portion slidingly and sealingly engaging said first cylindrical surface of said tubular body and a second cylindrical opposite end portion of smaller diameter slidingly and sealingly engaging said second cylindrical surface of said tubular body so that the effective annular area exposed to said predetermined pressure in said annular chamber is greater at said first end portion than at said second opposing end portion.

7. A well washing tool as set forth in claim 6 including a first annular seal between said first cylindrical surface of said tubular body and said first cylindrical end portion of said differential piston member and a second annular seal between said second cylindrical surface of said tubular body and said second cylindrical end portion of said differential piston member.

8. A well washing tool as set forth in claim 7 including a relief port through the walls of said tubular member between said first and second annular seals through which fluids between said first and second seals may be displaced to the exterior of said tool.

9. A well washing tool as set forth in claim 7 in which said valve means includes biasing means biasing said differential piston toward a position in which said second port means is blocked by said first cylindrical end portion of said differential piston member, said differential piston member being movable against said biasing means in response to said predetermined pressure in said annular chamber to unblock said second port means.

10. A well washing tool as set forth in claim 9 in which said biasing means comprises a helically wound spring disposed in said annular chamber between said differential piston member and a fixed shoulder therein.

11. A well washing tool comprising:

a tubular mandrel having a flow passage therethrough and the upper end of which is provided with means for connecting said tool in a pipe string extending to the surface of a well and the lower end of which may be provided with means for blocking flow of fluids from said pipe string through said mandrel flow passage;

an outer tubular body surrounding said mandrel;

an annular chamber between said mandrel and said surrounding tubular body, said annular chamber being in fluid communication with said mandrel flow passage through first port means provided in the walls of said mandrel, said tubular body being provided with second port means permitting fluid communication between said annular chamber and the exterior of said tool;

valve means carried within said annular chamber blocking said second port means and preventing said fluid communication between said annular chamber and said tool exterior but responsive to predetermined pressure communicated to said annular chamber through said first port means to unblock said second port means permitting fluid communication between said mandrel flow passage and said tool exterior through said first port means, said annular chamber and said second port means; and first and second packer assemblies carried on said mandrel at opposite ends thereof, each of said packer assemblies comprising a tubular packer body carried by said mandrel having an annular shoulder thereon, at least one resilient packer element surrounding said packer body adjacent said annular shoulder and an annular piston member having an annular head portion an inner surface of which slidingly and sealingly engages said mandrel and an outer surface of which slidingly and sealingly engages said tubular body, and a tubular sleeve portion extending from said head portion for slidingly and sealingly engaging the exterior of said packer body, the end of said head portion being exposed to pressure within said annular chamber so that said piston member is responsive to predetermined pressure communicated to said annular chamber through said first port means to move toward said annular shoulder axially compressing said packer element therebetween and forcing said packer element to radially expand.

12. A well washing tool as set forth in claim 11 in which said piston member sleeve portion and the inner diameter of said annular head portions are joined by an annular surface, said sleeve portion, said mandrel, said annular surface and one end of said tubular packer body defining a variable volume annular chamber.

13. A well washing tool as set forth in claim 12 including third port means providing fluid communication between said variable volume annular chamber and the exterior of said tool.

14. A well washing tool comprising:

a tubular mandrel having a central flow passage therethrough and the upper end of which is provided with means for connecting said tool in a pipe string extending to the surface of a well and the lower end of which may be provided with means for blocking flow of fluids from said pipe string through said flow passage;

first and second packer assemblies having annular sealing elements thereon carried on said mandrel at opposite ends thereof;

an outer tubular body surrounding said mandrel between said packer assemblies;

an annular chamber between said mandrel and said surrounding tubular body;

first port means providing fluid communication between said mandrel flow passage and said annular chamber;

second port means permitting fluid communication between said annular chamber and the exterior of said tool; and valve means carried within said annular chamber comprising a differential piston member and a biasing member, said biasing member biasing said piston member toward a position blocking said second port means, said differential piston member including a first diameter portion slidingly and sealingly engaging a first cylindrical surface of the interior of said tubular body and a second smaller diameter portion slidingly and sealingly engaging a second cylindrical surface on the interior of said tubular body creating a first annular area facing away from said biasing spring so that upon application of a predetermined pressure level to said first and second annular areas within said annular chamber the differential force created thereby overcomes said biasing member forcing said piston member to a position unblocking said second port means.

15. A well washing tool as set forth in claim 14 in which each of said packer assemblies comprises a tubular packer body carried by said mandrel having an annular shoulder thereon, at least one of said annular sealing elements surrounding said packer body adjacent said annular shoulder and an annular piston member engaging the exterior of said packer body adjacent said sealing element and one end of which is exposed to pressure within said annular chamber and by which said sealing elements are axially compressed and radially expanded in response to a predetermined pressure level within said annular chamber.

16. A method of circulating fluid in a well having a perforated casing therein comprising the steps of:

attaching a washing tool to the lower end of a pipe string having an open end flow passage therethrough, pressure responsive packing assemblies at opposite ends thereof, ports by which fluid communication may be established between said flow passage and the exterior of said tool, and valve means blocking said ports but pressure responsive to unblock said ports;

lowering said washing tool on said pipe string to the desired circulation level within said perforated casing while allowing any fluids in said well to be displaced into said pipe string through said open flow passage;

dropping a closure member through said pipe string for engagement with a corresponding seat in the lower end of said washing tool to block the open end thereof;

pumping fluid through said pipe string to said blocked washing tool flow passage and raising the pressure therein to a first predetermined level for hydraulic actuation and sealing engagement of said packer assemblies with said surrounding perforated casing;

raising the pressure level within said flow passage to a second and higher predetermined level for movement of said valve means, independently of said packer assemblies, to a position unblocking said ports; and circulating fluid through said pipe string and said tool, through perforations in said casing between said packing assemblies, through the well strata surrounding said casing, through perforations in said casing above said packing assemblies and back to the surface of said well through the annulus between said pipe string and said casing.

17. A method of circulating fluid as set forth in claim 16 and the further steps of:

ceasing said circulating of fluid;

reducing pressure within said flow passage closing said valve means and disengaging said packing assemblies; and removing said pipe string and tool from said well.

18. A method of circulating fluid as set forth in claim 17 in which, before said tool is removed from said well, fluid is pumped in the reverse direction through the annulus between said pipe string and said casing, through an opening at the bottom of said tool, through said flow passage and said pipe string to the surface of said well.

19. A method of circulating fluid as set forth in claim 17 in which, before said tool is removed from said well, it is raised a predetermined distance, another tool is passed downwardly through said pipe string and said flow passage for working on said well below said washing tool.

*20. A well washing tool comprising:*

*a tubular mandrel having a flow passage therethrough and the upper end of which is provided with means for connecting said tool in a pipe string extending to the surface of a well and the lower end of which may be provided with means for blocking flow of fluids from said pipe string through said mandrel flow passage;*

*an outer tubular body surrounding said mandrel;*

*an annular chamber between said mandrel and said surrounding tubular body, said annular chamber being in fluid communication with said mandrel flow passage through first port means provided in the walls of said mandrel, said tubular body being provided with second port means permitting fluid communication between said annular chamber and the exterior of said tool;*

*first and second packer assemblies carried on said mandrel at opposite ends thereof, each of said packer assemblies comprising a tubular packer body carried by said mandrel having an annular shoulder thereon, at least one resilient packer element surrounding each said packer body adjacent said annular shoulder and each said packer assembly having an annular piston member with an annular head portion from which extends a tubular sleeve portion, an inner surface of said annular head portion slidingly and sealingly engaging the exterior of said tubular mandrel and an outer surface of which sealingly engages the interior of said tubular body, said inner and outer surfaces being joined by an annular end surface which is exposed to fluid pressure within said annular chamber so that said piston member is responsive to predetermined pressure communicated to said annular chamber through said first port means to move said packer elements toward said annular shoulder axially compressing said packer elements therebetween for sealing against surrounding surfaces within said well, said first port means, said annular chamber, and said second port means then providing fluid communication for flow of fluids from said mandrel to the exterior of said tool between said first and second packer assemblies.*

*21. A well washing tool as set forth in claim 20 in which a variable volume annular chamber is provided around said mandrel and adjacent each of said packer bodies isolated from said annular chamber between said mandrel and said surrounding tubular body by said piston members and including third port means providing fluid communication between said variable volume annular chambers and the exterior of said tool.*

*22. A well washing tool as set forth in claim 20 in which said packer body is removably attached to said mandrel, removal of said packer body from said mandrel permitting removal of said packer element and said piston member from said mandrel.*

* * * * *